MULTICOLOR GRAPHIC ILLUMINATION DATA DISPLAY SYSTEM

Filed March 1, 1965 2 Sheets-Sheet 1

INVENTOR
JOHN C. BRAMER, JR.
BY Rupert J. Brady
ATTORNEY

MULTICOLOR GRAPHIC ILLUMINATION DATA DISPLAY SYSTEM

Filed March 1. 1965 2 Sheets-Sheet 2

INVENTOR
JOHN C. BRAMER, JR.

BY Rupert J. Brady
ATTORNEY

United States Patent Office 3,283,318
Patented Nov. 1, 1966

3,283,318

MULTICOLOR GRAPHIC ILLUMINATION DATA DISPLAY SYSTEM

John C. Bramer, Jr., Pittsburgh, Pa., assignor to Datagraphics Inc., Pittsburgh, Pa., a corporation of Pennsylvania Filed Mar. 1, 1965, Ser. No. 436,143
1 Claim. (Cl. 340—339)

The invention is a continuation-in-part of my copending application Serial No. 252,471, filed January 18, 1963, for Color Display Panel With Bistable Multi-Vibrator Matrix Lamp Control, now Patent 3,175,209. This invention relates broadly to illumination display systems and more particularly to an improvement in multicolor illumination display panel systems having bistable multivibrator illumination matrix means, selectively energizeable by a punched data card or the like for selectively illuminating selected areas of the display panel in selected colors for graphic displays of data.

In the display system of the present invention, a selected segment, or selected segments of the multiple segment data display panel, is illuminated in any of seven strikingly different colors by energizing a selected one, or a combination of the three primary colored lamps, disposed behind each display panel section, according to the data represented by such illumination with the different colors indicating magnitudes, or the like, of data according to a preselected scale of values. The colored lamps behind each display panel section are each controlled by an individual bistable multivibrator circuit, with each of said circuits individually controlled by photosensitive resistor elements or switches in a card reader type device, which may be remote from the panel. When a punched card or tape is placed in the card reader, light falls on only selected photosensitive resistor elements according to the arrangement of holes in the card governed by the data punched therein, to thus actuate the bistable multivibrator circuits controlled by the light energized resistor elements, thus effecting illumination of selected sections or segments of the display panel in the desired colors according to the data on the punched card.

Such a system has many applications and provides very rapid selection of data for display on the illuminated panel by merely throwing a switch or pushing a button. It is within the contemplation of the present invention that a plurality of card readers can be connected to a single illumination display panel, and the various card readers can be located at different locations remote from the display panel. Data cards on different information, such as inventory, traffic control, fire control, sales, military troop movements or buildups, etc., are kept up to date on punched data cards produced in a data processing center, and kept current by clerical help. Such data cards from different periods of time for purposes of comparison, or data cards pertaining to different geographical locations, etc., may be placed in different card readers, and by momentarily closing one switch the data in one card reader may be graphically illuminated on the display panel, and other chosen data from one of the other card readers can immediately thereafter be illuminated on the display panel, such as for purposes of comparison, by momentarily closing the switch for the card reader containing the desired data. At a sales meeting, for instance, such a preprogrammed illuminating panel can display to the sales staff a graphic picture of their results, showing them where gains have been made, where improvement is needed, or by comparison can show the difference and acceptance of a specific product in different areas, or the volume of sales in different areas.

Map overlays may be used with the display panel where the data is to be correlated with geographical locations.

With a plurality of card readers at different geographical locations feeding into a remotely located display panel, having a map overlay, current data from all the different remote locations may be constantly, simultaneously, displayed and kept up to date on the display panel. In this arrangement each remote card reader would only control a preselected section of the display panel. Such a system is graphically valuable for military applications, such as for providing up to date displayed logistics reports in a central headquarters.

It is an object of the invention to provide a multi-color, graphic illumination, data display system whereby data stored on punched cards, or the like, is graphically displayed on an output illumination panel in multiple colors according to preselected color code values.

Another object of the invention is to provide a construction of illumination display panel system in which a plurality of colored lights are disposed behind each surface section of the panel, with each light having an individual bistable multivibrator control circuit operable by individual light sensitive means in a card reader controlled by punched data cards, whereby selected sections of the panel can be illuminated in selected colors by the placement of the holes on the data cards.

A further object of the invention is to provide a construction of data display panel system which enables data stored on punched cards to be graphically illuminated in a display in selected multiple colors on an output panel by closing a single switch.

Still a further object of the invention is to provide such a graphic illumination system in which all of the data on the punched data card is simultaneously displayed in multiple illuminated colors on the output panel.

Other and further objects of the invention reside in the use of bistable multivibrator circuits for each lamp behind the display panel, the use of photosensitive resistor elements for triggering each multivibrator or flip-flop circuit, the use of plural card readers connected in parallel and feeding a single display panel, the use of plural card readers feeding information to a single display panel where each card reader controls only a preselected portion of the display panel, as well as other objects set forth more fully in the specification hereinafter following by reference to the accompanying drawings, in which:

Figures 1, 2, 4:
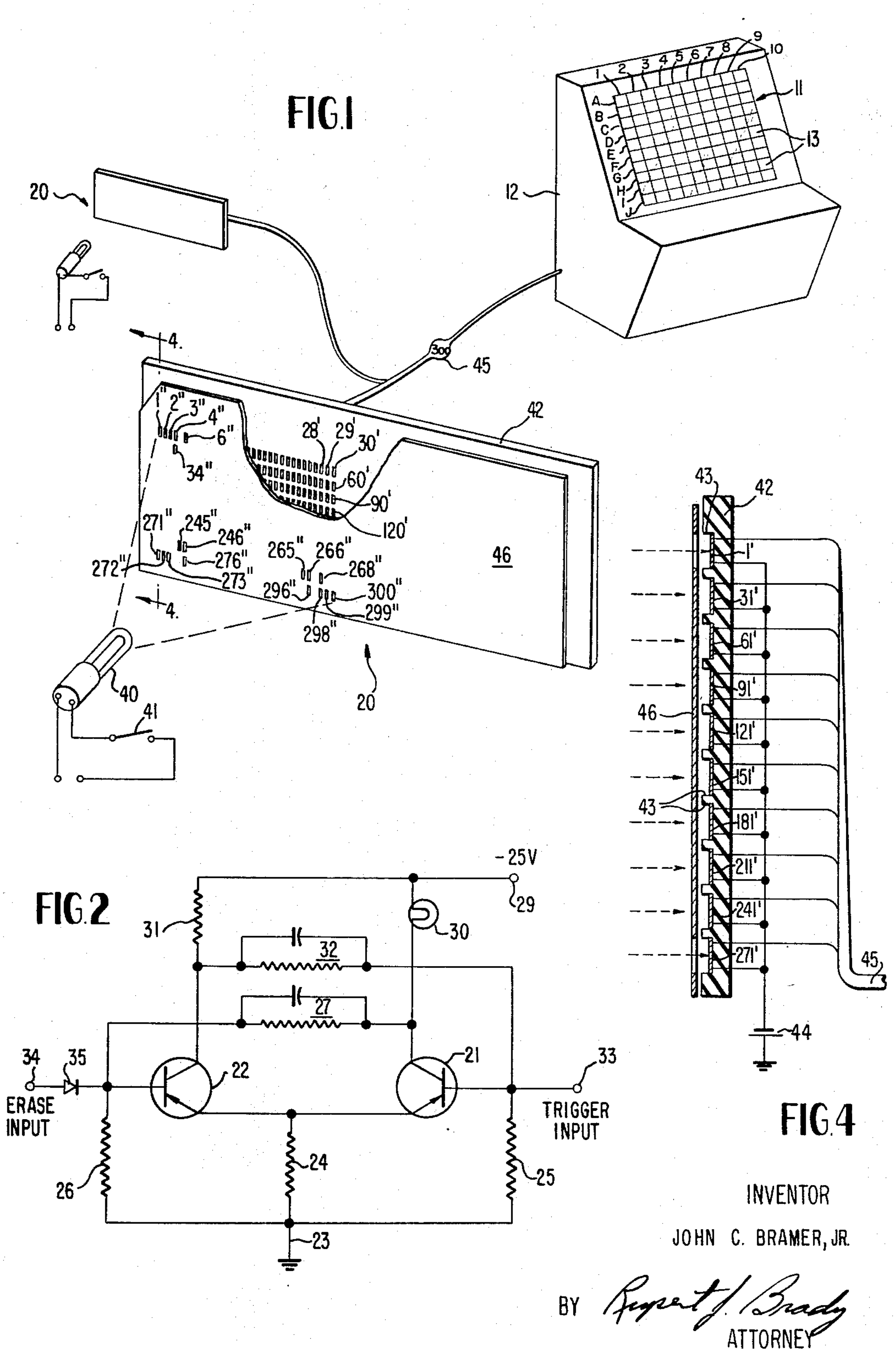
FIG. 1 is a perspective view of the illumination display system of the invention, shown partly in schematic form and partly broken away.
FIG. 2 is an electrical schematic diagram of a bistable multivibrator or saturated flip-flop circuit of the type used in the display panel circuit of FIG. 3.
FIG. 4 is an enlarged cross-sectional view taken substantially along line 4—4 of FIG. 1.

Referring to the drawings in greater detail, the graphic illumination display system of the invention, as shown in FIG. 1, consists of an output translucent display panel, indicated generally at 11, connected to the face of support body portion 12, such as a console. The translucent display panel 11 is divided into a plurality of equal sections or segments, represented generally by reference numeral 13, and for purposes of illustration the display panel illustrated is divided into one hundred equal sections 13 disposed in ten rows having the designation A–J and ten columns designated by reference numerals 1–10, respectively. Thus, each individual panel section 13 may be designated by a letter and number, such as panel area I–2, designating the panel section or area at the intersection of row I and column 2. It is to be understood, however, that the display panel can be constructed of any desired shape or size and divided into any desired number of and/or shaped sections, depending upon the particular application of the system. However, it has been found that a rectangular or square panel adapts to many different usages, but is nonetheless to be considered in this arrangement only for purposes of illustration. For particular applications transparent or translucent map overlays, or other graphic overlays, may be placed over the panel 11 to give meaning to the various sections of the output display panel.

Figure 3:
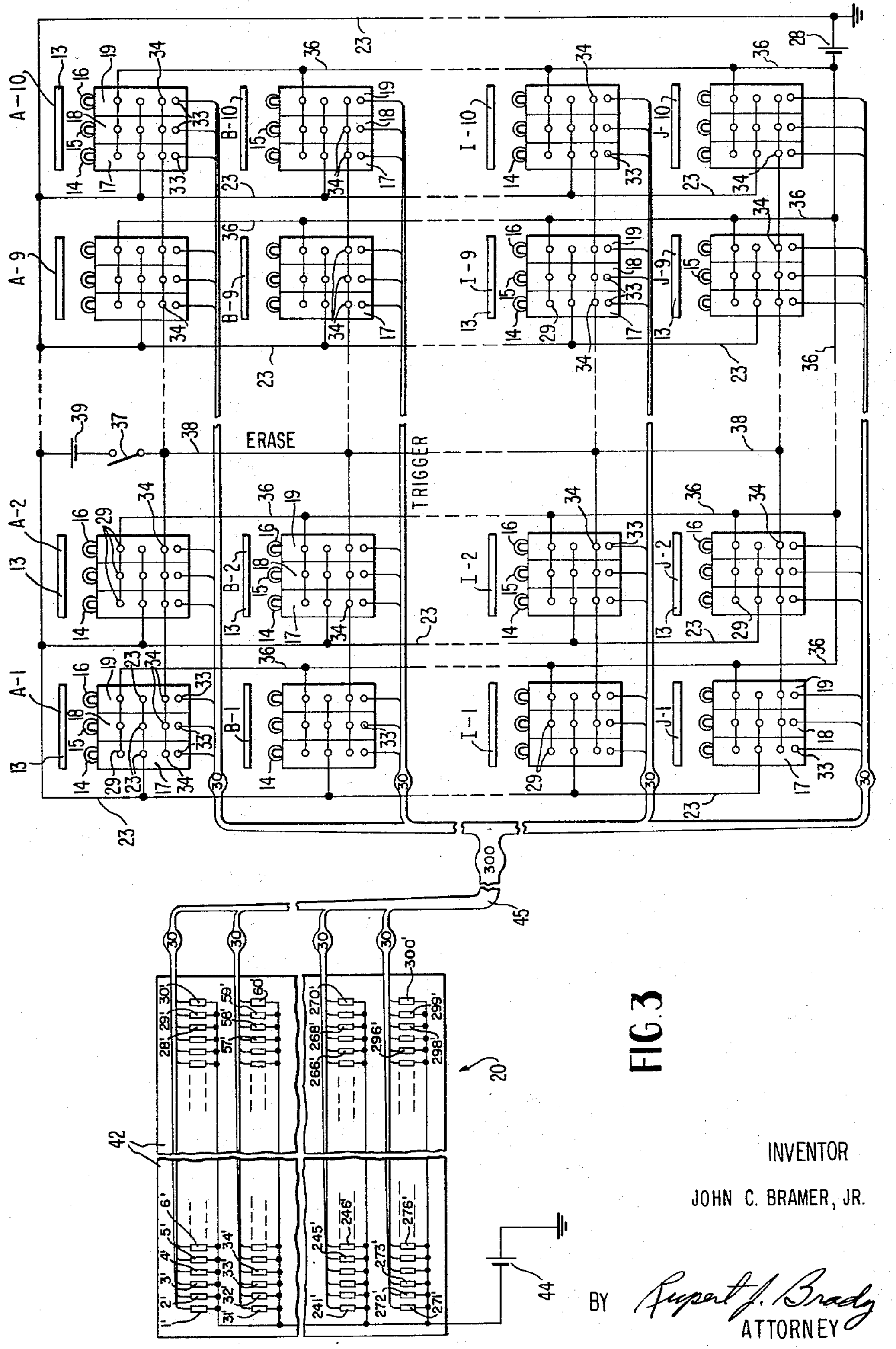
FIG. 3 is an electrical schematic diagram of the multicolor illumination display panel control system of the invention; with repetitious portions of the display panel circuit omitted for clarity in illustration.

A group of three colored lamps 14, 15 and 16, consisting of the primary colors for light, namely, red, blue and green, respectively, with each lamp having an individual bistable multivibrator, or saturated flip-flop circuits 17, 18 and 19, respectively, connected thereto as shown in FIG. 3, are positioned behind each of the one hundred panel areas or sections 13 of the translucent display panel 11. The three lamps behind each panel section may be selectively illuminated by their associated bistable circuits to any one of seven combinations of the three primary light colors by individual electrical control switch means in a card reader device, indicated generally at 20, the operation of which is explained more fully hereinafter following. The output display panel 11 and its associated support body portion 12 may be far removed from the card reader device 20 which actuates the panel, but they may also be arranged in close proximity to each other, and where desirable may be arranged in the same console cabinet, as schematically illustrated in FIG. 1. For particular applications, a plurality of card reader devices 20, may be connected to a single output display panel 11 so that information from different card readers may be successively displayed on panel 11 by subsequent operation of the desired card readers. In this arrangement, the plurality of card reader devices would be connected in electrical parallel with each other, as will become apparent to one skilled in the art from the circuit description of the card reader further in the specification.

For other applications a plurality of card reader devices 20 may be connected individually to the output display panel 11, this arrangement not being shown, such that each card reader device is connected to control the illumination of a preselected portion of the display panel. This arrangement would have application where various portions of the display panel, located at a central location, are representative of different remote geographical locations and card reader devices remotely located at the different geographical locations are connected only to those sections 13 of the display panel which correspond to the card reader locations.

In the system shown in FIG. 1, the only electrical components carried by support body portion 12 consist of the three hundred bistable multivibrator circuits, connected in groups of three, behind each panel section 13, as indicated at 17, 18 and 19, with their associated primary colored lamps 14, 15 and 16 and associated interconnecting wires. Each of the bistable multivibrator circuits, or saturated flip-flop circuits, behind each panel section, is preferably transistorized as shown in FIG. 2. This is a standard RC coupled flip-flop switching circuit, symmetrical in design and comprising identical transistors 21 and 22 having their emitters commonly connected to ground buss 23 through emitter resistor 24, with their base elements connected to ground 23 through resistors 25 and 26. The collector of transistor 21 is connected to the base of transistor 22 through RC circuit 27, and is connected to a source of negative potential, as indicated by battery 28 in FIG. 3, such as −25 volts D.C., through terminal 29 and incandescent lamp 30. Incandescent lamp 30 serves as the current-limiting resistor and corresponds to the primary colored lamps 14, 15 and 16, as shown in the circuit of FIG. 3. The collector of transistor 22 is connected to terminal 29 through current-limiting resistor 31 and is connected to the base of transistor 21 through RC circuit 32. The circuit is symmetrical with corresponding components being of equal value and with the resistance of lamp 30 and resistor 31 being substantially equal. For operation of the bistable multivibrator or flip-flop circuit, a positive input trigger or pulse is applied to the base of transistor 21 through trigger input terminal 33 to render transistor 21 conductive, illuminating lamp 30, in the collector circuit thereof, and rendering transistor 22 nonconductive. Since the circuit is designed as a bistable multivibrator or flip-flop, transistor 21 and lamp 30 will remain ON even after the input trigger is removed, until an erase input pulse is applied to the base of transistor 22 through erase pulse input terminal 34 and unidirectional current conducting device or diode 35 to switch the state of the flip-flop circuit, rendering transistor 22 conductive or ON and turning OFF transistor 21 and lamp 30. The corresponding circuit terminals have been designated by similar reference numerals on the schematic circuit block 17, 18 and 19 in FIG. 3, each of which contains the circuit shown in FIG. 2. There are, therefore, three of the flip-flop circuits as shown in FIG. 2 behind each section 13 of the display panel, and three hundred of these circuits behind the entire panel of the example described herein. Whenever an input trigger is applied to terminal 33 of bistable flip-flop circuit 17, 18 and/or 19, the corresponding lamp 14, 15 and/or 16 is illuminated and will remain illuminated until an input erase pulse is applied to terminal 34 of the energized circuit.

Referring to the electrical schematic diagram of the multivibrator illumination display panel control system of the invention, the ground buss 23 is commonly connected to the ground circuit of each of the three hundred flip-flop circuits. In a similar manner the power input terminals 29 of each of the three hundred bistable flip-flop circuits are connected to the negative D.C. power source 28, as previously indicated, through conductors 36. The erase pulse input terminals 34 of all three hundred flip-flop circuits are commonly connected to one side of normally open erase switch 37 through buss 38. The opposite side of erase switch 37 is connected to the negative terminal of battery 39, the positive terminal of which is connected to ground through buss 23. Battery 39 thus constitutes a negative source of D.C. potential for the erase circuit for applying a signal of approximately −1 volt to terminals 34 when erase switch 37 is closed. Switch 37 may be of push-button type and need only be closed momentarily to simultaneously reset all of the flip-flop circuits in the panel to thus extinguish all of the lamps 14, 15 and 16 when new data is to be displayed on the panel. The erase input circuit of each flip-flop circuit, as indicated in FIG. 2, includes a diode 35 which prevents in a positive manner any possibility of interaction between the plurality of flip-flop circuits from feedback through the common erase circuit.

The card reader device 20 which controls the bistable flip-flop circuits in the output display panel consists of a high intensity light source 40 connected to a source of power (not shown) through a momentary closure type switch 41, with the light 40 disposed in spaced relation to a body portion 42 constructed of insulation material, such as plastic or the like, and carrying a plurality of photosensitive resistors 1′–300′ in individual isolated recesses 43 therein, as shown more particularly in FIG. 4. For the example described herein, three hundred recesses 43 are provided on one face of body portion 42 with a photosensitive resistor element at the bottom of each recess, that is, three hundred photosensitive resistor elements 1′–300′, which perform as photosensitive resistor switches, are carried by body portion 42 positioned thereon, corresponding generally to the row and column positions of the three hundred colored lamps 14, 15, 16, and flip-flop circuits 17, 18, 19, arranged in rows A–J and columns 1–10 behind the display panel. One terminal of each photosensitive resistor 1′–300′ is connected to the negative terminal of a source of D.C. potential, such as a one volt battery 44, while the positive terminal of the potential source is connected to ground, as indicated in FIGS. 3 and 4. The opposite terminals of photosensitive resistors 1′–300′ are individually connected to the trigger input terminals 33 of the correspondingly positioned flip-flop circuits 17, 18 and 19 in the groups of flip-flop circuits in row and column positions A–1 to A–10; B–1 to B–10; C–1 to C–10; D–1 to D–10; E–1 to E–10; F–1 to F–10; G–1 to G–10; H–1 to H–10; I–1 to I–10; and J–1 to J–10, respectively. Thus each of the flip-flop circuits has an individual photosensitive control resistor in the trigger input circuit between the battery 44 and trigger input terminal 33, which has a very high resistance in the absence of light, that is, when it is in the dark, and a very low resistance when exposed to light. The photosensitive elements, well known in the art, thus function as switches in the input circuits of the flip-flop circuits, operating to send trigger signals to input terminals 33 to switch the conducting states of the bistable multivibrator circuits to turn the associated colored lamps ON when the elements are exposed to light, and serving to maintain an effective open circuit by their high resistance, and the flip-flop circuits and associated colored lamp in the OFF condition, in the absence of light.

As indicated in the drawings, the photosensitive resistors 1′–300′ are disposed in ten rows, with each row containing thirty photosensitive resistor elements. Since the photosensitive resistors are connected by individual conductors in the three hundred conductor cable 45 to the correspondingly positioned bistable flip-flop circuits behind the display panel, this means that three photosensitive resistor elements are provided for each section 13 of the display panel since there are three flip-flop circuits behind each of the display panel sections. For example, photosensitive resistor elements 28′, 29′, and 30′ are respectively connected to the trigger input terminals 33 of bistable flip-flop circuits 17, 18 and 19 behind panel section 13 at the intersection of row A, column 10, designated as display panel section A–10.

A punched data card 46 is disposed between high intensity light source 40 and body portion 42 of the card reader device such that the data card overlies body portion 42. Data card 46 is adapted to have three hundred apertures 1″–300″ punched therein, disposed in registration with the photosensitive resistors 1′–300′ in the recesses of body portion 42. If all three hundred apertures were punched in a data card, upon illumination of light source 40, by closing switch 41, all three hundred of the colored lamps behind the display panel would be illuminated and the entire display panel would be illuminated with white light.

To further describe the operation of the system of the invention, as indicated in FIGS. 1 and 4, a punched data card 46, having apertures 1″, 2″, 3″, 4″, 6″, 34″, 245″, 246″, 265″, 266″ 268″, 271″, 272″, 273″, 276″, 296″, 298″, 299″ and 300″ punched therein, is inserted in overlying relation to the corresponding photosensitive resistors on body portion 42. Upon momentary closure of switch 41 high intensity light source 40 is momentarily illuminated, thus illuminating the photosensitive resistors 1′, 2′, 3′, 4′, 6′, 34′, 245′, 246′, 265′, 266′, 268′, 271′, 272′, 273′, 276′, 296′, 298′, 299′ and 300′, while maintaining the remainder of the photosensitive resistors in the dark. The apertures in the punched data card are arranged to register with the appropriate recesses 43 in body portion 42, and the arrangement of recesses prevents light shining through the apertures in the punched data card onto the corresponding photosensitive resistors from also illuminating adjacent photosensitive resistors which do not have a corresponding aperture punched in the card. The flip-flop circuits in the data display panel, whose photosensitive resistor elements are illuminated, are thus supplied with input triggers on terminals 33 thereof over the corresponding individual conductors in cable 45 from the battery 44 to flip the state of the corresponding flip-flop circuits so as to illuminate the lamps 14, 15 and/or 16 associated therewith, to thus illuminate the display panel. In the example set forth, section A–1, of the display panel, is illuminated in white light, since the red, blue and green lamps 14, 15 and 16 behind this section of the panel are simultaneously illuminated due to apertures 1″, 2″, and 3″ in the data card. Section A–2 of the display panel is illuminated in yellow light, since only red and green lamps 14 and 16 are illuminated behind this section of the display panel, due to the placement of apertures 4″ and 6″ on the data card. Since only a single aperture 34″ is provided in the data card for the position corresponding to section B–2 of the display panel, this section of the display panel is illuminated in red light since only lamp 14 is illuminated behind this section.

In corresponding manner, due to the placement of apertures in the lower portion of data card 46 display panel section I–2 is illuminated in blue-green light since apertures 245″ and 246″ cause only blue lamp 15 and green lamp 16, respectively, to be illuminated behind this panel section. Panel sections J–1 and J–10 are both illuminated in white light, since all three of the lamps behind each section are illuminated due to the presence of three apertures in the card for each of these sections. Panel section J–2 is illuminated in green light since aperture 276″ in the card causes illumination of only green lamp 16 behind this panel section, while aperture 296″ causes the illumination of only blue lamp 15 behind panel section J–9. In a similar manner, apertures 265″ and 366″ illuminate red and blue lamps 14 and 15 behind panel section I–9 to thus illuminate this panel section in purple light, while aperture 268″ causes panel section I–10 to appear red by illuminating only red lamp 14. The punched card 46, with the data apertures therein, as indicated in FIG. 1, thus provides an example for illuminating selective sections of the display panel in the seven different possible colors provided by the three lamps behind each panel section. The remainder of the panel sections appear dark.

When switch 41 is opened and lamp 40 is extinguished, the mentioned panel sections will remain illuminated in their respective colors, since the circuits controlling the colored lamps behind the panel are bistable multivibrator circuits or saturated flip-flop circuits which will remain in the state to which they have been switched by the input triggers sent to them upon illumination of their corresponding photosensitive resistor switches, even after the trigger signals are removed from the input terminals 33 of the circuits by no longer illuminating the photosensitive resistors. To remove the data illuminated on the panel, erase switch 36 is depressed which transmits an erase pulse to the terminals 34 of each of the three hundred flip-flop circuits behind the display panel, causing those circuits which have been switched to the illumination state to be switched to the opposite state, thus extinguishing all lamps behind the display panel preparatory to receipt of new input trigger signals on terminals 33 from another punched data card. The color in which the various sections of the display panel are illuminated, if they are illuminated at all, is thus dependent upon the position and number of apertures on the data card corresponding to the panel sections.

As indicated in FIG. 1, a plurality of card reader devices 20 may be connected in electrical parallel with each other and to the display panel through the common three hundred conductor cable 45 such that each card reader is capable of illuminating all sections of the display panel.

While the invention had been described and illustrated in certain preferred embodiments, it is realized that modifications may be made by using different forms of bistable electronic flip-flop circuits, from those illustrated, as well as other modifications, including modifications in the card reader device, and it is to be understood that no limitations upon the invention are intended other than those imposed by the scope of the appended claim.

What I claim as new and desire to secure by Letters Patent of the United States, is as follows:

A multicolor illumination display panel comprising, light transmitting panel means divided into a plurality of panel sections disposed in rows and columns, a plurality of groups of bistable multivibrator circuits, each of said bistable multivibrator circuits being normally conducting and having a first and a second stable state and normally disposed in the second stable state, a light connected with each of said bistable multivibrator circuits for illumination when said multvibrator circuit is switched to said first stable state, each of said bistable multivibrator circuits including a pair of semiconductor means normally disposed in opposite stable states with said light connected with the semiconductor means which is normally disposed in a nonconductive state, the lights of each group of bistable multivibrator circuits of said plurality of groups being of the three primary colors and connected in corresponding groups behind individual panel sections of said light transmitting panel, a source of potential, a body portion of insulation material having a plurality of relatively deep recesses therein disposed in rows and columns, a plurality of light sensitive resistor means disposed in said plurality of recesses and connected between said source of potential and the individual bistable multivibrator circuits, as illumination source positioned opposite said plurality of light sensitive resistor means, a punched card having information apertures therein adapted for placement between said illumination source and said light sensitive resistor means to illuminate selected of said light sensitive resistor means whereby selected bistable multivibrator circuits of said groups corresponding to the illuminated light sensitive resistor means are switched to the first stable state to illuminate selected primary colored lights in the groups to thus illuminate selected individual panel sections on the display panel in selected multiple colors of the spectrum of primary colored lights according to the aperture information on said punched card, and said body portion between adjacent recesses forming light shielding ribs between adjacent light sensitive resistor means and supported said punched card in overlying relation.

References Cited by the Examiner

UNITED STATES PATENTS

| | | | |
|---|---|---|---|
| 1,072,152 | 9/1913 | Ocampo | 340—339 |
| 2,069,851 | 2/1937 | Rosenberg | 340—339 |
| 2,148,450 | 2/1939 | Eitzen | 340—339 |
| 2,239,522 | 4/1941 | Hammond | 340—339 |
| 3,005,915 | 10/1961 | White | 250—214 |
| 3,020,418 | 2/1962 | Emile | 340—252 X |
| 3,041,477 | 6/1962 | Budts | 307—88.5 |
| 3,090,039 | 5/1963 | Walls. | |
| 3,122,734 | 2/1964 | Rice. | |
| 3,147,469 | 9/1964 | Buchsbaum | 340—324 X |
| 3,165,633 | 1/1965 | Wunderman | 307—88.5 |
| 3,189,745 | 6/1965 | Reymersdal | 250—214 |
| 3,193,816 | 7/1965 | Brath | 250—209 X |

NEIL C. READ, *Primary Examiner.*

R. M. GOLDMAN, *Assistant Examiner.*